3,041,826
TURBOFAN AFTERBURNER FUEL CONTROL
Richard J. Coar, Jupiter, Fla., assignor to United Aircraft Corporation, East Hartford, Conn., a corporation of Delaware
Filed Jan. 27, 1959, Ser. No. 789,365
10 Claims. (Cl. 60—35.6)

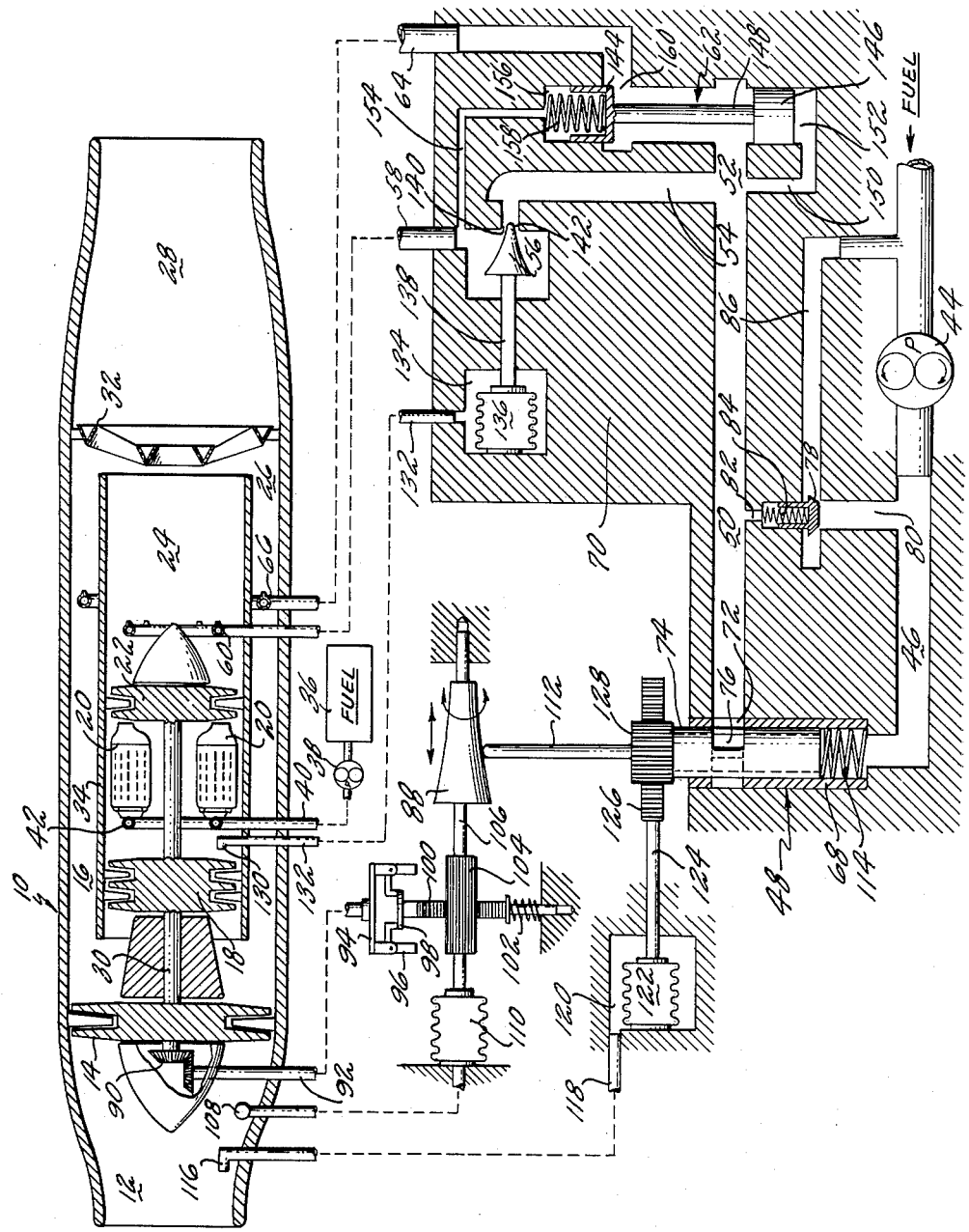

This invention relates to jet engine fuel controls, more particularly to a fuel control for the afterburner system of an afterburning turbofan engine.

In an afterburning turbofan engine, the ratio of the airflow through the bypass duct to the airflow through the turbine varies with operating conditions. Efficient afterburning requires that the distribution of afterburning fuel be in proportion to the airflow through these respective portions of the engine. The present invention is directed to a fuel control which provides the required fuel distribution. The fuel control accomplishes this by metering a quantity of fuel proportional to the airflow rate through the fan, and then subtracting from this fuel flow an amount proportional to the airflow through the turbine. This last amount is injected into the gases leaving the turbine, while the remaining fuel is injected into the bypass air. In this way the fuel flow at both injection stations is proportioned to the airflow at the respective stations.

An object of this invention, therefore, is to provide a fuel control for the afterburner system of an afterburning turbofan engine.

Another object of the invention is to provide a turbofan engine fuel control which correctly proportions internal afterburner fuel flow and bypass burner fuel flow.

Another object of the invention is to provide a turbojet engine fuel control which initially proportions fuel flow to fan airflow rate and then divides the proportioned fuel between the internal afterburner and the bypass burner as a function of the airflow in the turbojet portion of the engine.

Still another object of the invention is to provide a turbojet engine fuel control which first proportions afterburner fuel flow as a function of fan speed and fan inlet air temperature times fan inlet air pressure, subtracts from this an amount proportional to the turbojet burner pressure for injection into the internal afterburner and injects the remainder into the bypass burner.

Other objects and advantages will be apparent from the following specification and claims, and from the accompanying drawing which illustrates an embodiment of the invention.

In the drawing:

The single FIGURE shows an afterburning turbofan engine having an afterburner system fuel control in accordance with my invention.

The operating characteristic of a typical turbofan engine is such that the fan operates in a range where the corrected airflow is a unique function of the corrected fan speed, i.e.:

$$W_a \frac{\sqrt{\theta_2}}{\delta_2} = f_1\left(\frac{N_f}{\sqrt{\theta_2}}\right)$$

where:
$W_a$ = fan airflow
$\theta_2$ = fan inlet temperature
$\delta_2$ = fan inlet pressure
$N_f$ = fan speed.

Fan airflow then is expressed as:

$$W_a \frac{\delta_2}{\sqrt{\theta_2}} \times f_1\left(\frac{N_f}{\sqrt{\theta_2}}\right)$$

which is equivalent to:

$$W_a = \delta_2 \times f_2(N_f, \theta_2)$$

In other words, if afterburner fuel flow is metered in proportion to the $f_2$ function of fan speed and fan inlet temperature times fan inlet pressure, the resulting afterburner fuel flow will be proportional to airflow through the fan. The fuel-air ratio for the fan thus will be constant.

Since the turbine nozzles would be choked during afterburner operating conditions, and since the temperature at the turbine nozzles is essentially constant over the operating range involved, the airflow through the turbojet portion of the engine can be considered to vary directly with the absolute pressure in the turbojet burner.

Fuel flow can be metered proportional to this pressure and injected into the gases leaving the turbine. The fuel-air ratio in this internal afterburner thus would be constant, its value depending on the proportions of the system. Subtracting this quantity of fuel from the fuel flow initially proportioned in accordance with fan airflow gives a remaining quantity of fuel which may be admitted to the fuel injection station in the annular bypass gas stream.

Referring to the drawing in detail, 10 indicates a turbofan engine having inlet 12, fan 14, bypass duct 16, compressor 18, burners 20, turbine 22, internal afterburner 24, bypass burner 26 and exhaust nozzle 28 in the direction of airflow through the engine. Turbine 22 is drivingly connected to compressor 18 and fan 14 by shaft 30. The flameholder 32 at the upstream end of exhaust nozzle 28 is provided to stabilize combustion in internal afterburner 24 and bypass burner 26.

Compressor 18, burners 20, turbine 22, and internal afterburner 24 are surrounded by casing 34 and together define, in effect, an internal turbojet unit within engine 10. Air entering inlet 12 and compressed by fan 14 is divided downstream of the fan with one part of the air entering bypass duct 16 and another part of the air entering compressor 18 and the turbojet unit. Fuel for burners 20 is supplied from tank 36 by pump 38 through conduit 40 to ring manifold 42 connecting the burners. The quantity of fuel flowing to the burners would be metered by a fuel control, not shown, which would be interposed in conduit 40 between pump 38 and ring manifold 42. A fuel control for this purpose is disclosed in copending application Serial No. 491,824, filed March 3, 1955, for Fuel Control for Jet Engine.

Fuel for the afterburner system of the engine is supplied when required from a tank, which may be tank 36, by pump 44 through passage 46 to metering valve 48. Metered fuel flows from the valve through passage 50 to chamber 52. Here the fuel is divided with one portion of the fuel flowing through passage 54 and past valve 56 to conduit 58 and ring manifold 60 in internal afterburner 24. The other portion of the fuel flows from chamber 52 through pressure regulating valve 62 to conduit 64 and ring manifold 66 in bypass burner 26.

The metering of the fuel flow in this system and the apportionment of the fuel between internal afterburner manifold 60 and bypass burner manifold 66 will now be described. Metering valve 48 is a conventional multiplying window port valve and includes cylindrical liner 68 fixed in control casing 70 and having one or more ports 72 therein communicating with passage 50. Sleeve 74 is in sliding engagement with the interior of liner 68 and contains one or more ports 76 cooperating with ports 72. Through rotary and translational movement of the sleeve the effective area of the metering valve ports is defined.

The pressure drop across metering valve 48 is regulated or held constant by bypass valve 78. The lower side of the bypass valve is subjected to the pressure on the upstream side of the metering valve by passage 80 connected to passage 46, while the upper side of the bypass valve is subjected to the pressure on the downstream side of the metering valve by passage 82 connected to passage 50. Spring 84 is mounted between the upper side of bypass valve 78 and the casing and loads the valve against the pressure in passage 80. Fuel bypassed by valve 78 is delivered through passage 86 to the inlet of pump 44.

Rotary motion and translatory motion are imparted to sleeve 74 in metering valve 48 to vary the effective area of the metering ports in accordance with fan speed, fan inlet temperature and fan inlet pressure in a manner to be described. Translatory motion is imparted to sleeve 74 from eccentrically mounted three-dimension cam 88 which is rotated in accordance with fan speed and translated in accordance with fan inlet temperature. Bevel gear 90 mounted on the forward end of shaft 30 drives gear shaft 92 which is connected to plate 94 carrying flyweights 96. The inner arm of the flyweights abuts shoulder 98 on rack 100 which is loaded in an upward direction by spring 102. Rack 100 meshes with pinion 104 mounted on shaft 106 which also carries three-dimension cam 88. Variations in fan rotational speed are reflected by displacement of the flyweights which movement is translated to the rack and pinion to rotate the three-dimension cam in accordance with the speed variations.

Fan inlet temperature is sensed by bulb 108 mounted in inlet 12 and connected to temperature responsive bellows 110. One end of the bellows is fixed to the control casing and the opposite free end is connected to shaft 106. Thus, variations in fan inlet temperature result in expansion or contraction of bellows 110 which movement is transmitted to shaft 106 and three-dimension cam 88 to translate the cam. Follower 112 is connected to the upper end of sleeve 74 and is loaded against the surface of cam 88 by spring 114 at the bottom of the sleeve. Through the follower, any movement of cam 88 as the result of a change in fan speed or a variation in fan inlet temperature translates sleeve 74 to vary the effective area of metering ports 72 and 76 accordingly.

Fan inlet pressure is sensed by total pressure station 116 mounted in inlet 12. The pressure station is connected by conduit 118 to chamber 120 containing evacuated bellows 122. One end of the bellows is fixed to the control casing, which defines chamber 120, and the opposite free end of the bellows is connected to rod 124. The rod is connected to rack 126 which meshes with pinion 128 formed about the upper end of sleeve 74. Variations in fan inlet pressure result in expansion or contraction of bellows 122 which movement is transmitted through rod 124 and rack 126 to pinion 128 and sleeve 74 to rotate the sleeve and vary the effective area of metering ports 72 and 76 accordingly.

By virtue of the described structure which varies the effective area of metering valve 48 proportional to fan inlet pressure multiplied by the desired function of fan speed and fan inlet temperature, fuel flow is metered by the valve in proportion to the air flow through fan 14 and thus the fuel-air ratio for the fan will be substantially constant. The metered fuel delivered to passage 50 and chamber 52 remains to be apportioned between internal afterburner 24 and bypass burner 26.

Burner pressure in the turbojet unit is sensed by total pressure station 130 located downstream of compressor 18 adjacent burners 20. The pressure station is connected by conduit 132 to chamber 134 in the control casing. The chamber contains evacuated bellows 136, one end of which is fixed to the control casing. The opposite free end of the bellows is connected to rod 138 which is connected to valve 56. Valve 56 is a contoured needle valve which cooperates with seat 140 in the control casing to define the area of orifice 142 between passage 54 and conduit 58. Variations in burner pressure will expand or contract bellows 136 which movement is transmitted by rod 138 to valve 56 to vary the position of the valve with respect to its seat. Since the airflow through compressor 18 and the turbojet unit can be considered to vary directly with burner pressure, and since valve 56 is positioned in accordance with absolute burner pressure, the flow of fuel from chamber 52 through orifice 142 to internal afterburner ring manifold 60 is made proportional to compressor airflow by proper contouring of valve 56.

The remaining fuel in chamber 52 passes through pressure regulating valve 62 to be injected into bypass burner 26 through ring manifold 66. The pressure regulating valve includes pistons 144 and 146 connected by rod 148 and sensitive to the pressure drop across burner pressure valve 56. The pressure in chamber 52, which is the pressure on the upstream side of valve 56, is admitted through passage 150 to chamber 152 at the bottom side of piston 146. The pressure on the downstream side of valve 56 is admitted through passage 154 to chamber 156 on the upper side of piston 144. The pressure in chamber 52 acts equally on the common inner faces of pistons 144 and 146, while spring 158 in chamber 156 loads pressure regulating valve 62 in a downward direction. Thus, by the application of the upstream and downstream pressures from valve 56 to opposite ends of pressure regulating valve 62, the pressure regulating valve is positioned in accordance with the pressure drop across valve 56.

Piston 144 cooperates with the entrance to conduit 64 to define variable area orifice 160 leading into the conduit. This orifice determines the quantity of fuel flowing to the bypass burner.

The amount of afterburning or fuel-air ratio in the bypass burner and internal afterburner can be varied in several ways. One way is to vary the load on spring 84 behind bypass valve 78 which will vary the fuel-air ratio both in the bypass burner 26 and the internal afterburner 24. Another way is to vary the load on spring 158 associated with pressure regulating valve 62, the result of which will be to vary the fuel-air ratio in internal afterburner 24. A system for controlling afterburner fuel flow is disclosed in the copending application of Philip S. Hopper, Serial No. 789,303, filed January 27, 1959 for Turbofan Afterburner Fuel Control Improvement.

It is to be understood that the invention is not limited to the specific embodiment herein illustrated and described, but may be used in other ways without departure from its spirit as defined by the following claims.

I claim:

1. A fuel control system for a turbofan engine having a fan, an internal engine including an afterburner, and a bypass burner, said system including means for metering fuel proportional to the airflow rate through said fan, means responsive to an engine pressure indicative of internal engine airflow for admitting a portion of said metered fuel to said internal engine afterburner and means for admitting the remainder of said metered fuel to said bypass burner.

2. A fuel control system for a turbofan engine having a fan, an internal engine including an afterburner, and a bypass burner, said system including means for metering fuel proportional to the airflow rate through said fan, valve means actuated in response to an engine pressure indicative of internal engine airflow for admitting a portion of said metered fuel to said internal engine afterburner and means responsive to the pressure drop across said valve means for admitting the remainder of said metered fuel to said bypass burner.

3. For a turbofan engine having a fan, an internal engine having an afterburner, and a bypass burner, a fuel system including conduit means through which fuel is delivered to said engine, first metering means in said conduit, means responsive to fan speed, fan inlet temperature and fan inlet pressure for varying the effective area of said first metering means, second metering means in said conduit responsive to an internal engine pressure for admitting fuel to said internal engine afterburner and third means in said conduit for admitting fuel to said bypass burner.

4. For a turbofan engine having a fan, an internal engine having an afterburner, and a bypass burner, a fuel system including conduit means through which fuel is delivered to said engine, first metering means in said conduit, means responsive to fan speed, fan inlet temperature and fan inlet pressure for varying the effective area of said first metering means, second metering means in said conduit responsive to an internal engine pressure for admitting fuel to said internal engine afterburner and third means in said conduit responsive to the pressure drop across said second metering means for admitting fuel to said bypass burner.

5. For a turbofan engine having a fan, an internal engine having an afterburner, and a bypass burner, a fuel system including conduit means through which fuel is delivered to said engine, first metering means in said conduit, means responsive to fan speed, fan inlet temperature and fan inlet pressure for varying the effective area of said first metering means, means for regulating the pressure drop across said first metering means, second metering means in said conduit responsive to an internal engine pressure for admitting fuel to said internal engine afterburner and third means in said conduit responsive to the pressure drop across said second metering means for admitting fuel to said bypass burner.

6. For a turbofan engine having a fan, an internal engine having an afterburner, and a bypass burner, a fuel system including conduit means through which fuel is delivered to said engine, first metering means in said conduit, means responsive to fan speed, fan inlet temperature and fan inlet pressure for varying the effective area of said first metering means, second metering means in said conduit downstream of said first metering means and responsive to an internal engine pressure for admitting fuel to said internal engine afterburner, and third means in said conduit downstream of said first metering means and in parallel with said second metering means for admitting fuel to said bypass burner.

7. An afterburner fuel system for a turbofan engine having a fan, a burner, an internal afterburner, and a bypass burner, said fuel system including conduit means through which afterburner fuel is supplied to said engine, multiplying port metering means in said conduit means, means responsive to fan speed, fan inlet temperature and fan inlet pressure absolute for actuating said multiplying port metering means to meter fuel proportional to a function of fan speed and fan inlet temperature times fan inlet pressure absolute, first valve means in said conduit means downstream of said multiplying port metering means controlling fuel flow to said internal afterburner, means responsive to burner pressure absolute for actuating said first valve means, second valve means in said conduit means downstream of said multiplying port metering means and in parallel with said first valve means controlling fuel flow to said bypass burner, and means responsive to the pressure drop across said first valve means for actuating said second valve means.

8. An afterburner fuel system for a turbofan engine having a fan, a burner, an internal afterburner, and a bypass burner, said fuel system including conduit means through which afterburner fuel is supplied to said engine, multiplying port metering means in said conduit means, means responsive to fan speed, fan inlet temperature and fan inlet pressure absolute for actuating said multiplying port metering means to meter fuel proportional to a function of fan speed and fan inlet temperature times fan inlet pressure absolute, means for regulating the pressure drop across said multiplying port metering means, first valve means in said conduit means downstream of said multiplying port metering means controlling fuel flow to said internal afterburner, means responsive to burner pressure absolute for actuating said first valve means, second valve means in said conduit means downstream of said multiplying port metering means and in parallel with said first valve means controlling fuel flow to said bypass burner, and means responsive to the pressure drop across said first valve means for actuating said second valve means.

9. An afterburner fuel system for a turbofan engine having a fan, a burner, an internal afterburner, and a bypass burner, said fuel system including conduit means through which afterburner fuel is supplied to said engine, first valve means in said conduit means, said valve means being movable in rotary and translational directions for varying the effective area thereof, means responsive to fan speed and fan inlet temperature for moving said first valve means in one of said directions, means responsive to fan inlet pressure absolute for moving said first valve means in the other of said directions, means for regulating the pressure drop across said first valve means, second valve means in said conduit means downstream of said first valve means controlling fuel flow to said internal afterburner, means responsive to burner pressure absolute for actuating said second valve means, third valve means in said conduit means downstream of said first valve means and in parallel with said second valve means controlling fuel flow to said bypass burner, and means responsive to the pressure drop across said second valve means for actuating said third valve means.

10. An afterburner fuel system for a turbofan engine having a fan, a compressor, an internal afterburner, and a bypass burner, said fuel system including means for metering a quantity of fuel proportional to the airflow rate through said fan, means for subtracting from the metered fuel an amount proportional to the airflow through said compressor and injecting said amount into said internal afterburner, and means for injecting the remaining metered fuel into said bypass burner.

References Cited in the file of this patent

UNITED STATES PATENTS

| | | |
|---|---|---|
| 2,371,889 | Hermitte | Mar. 20, 1945 |
| 2,498,939 | Bobier | Feb. 28, 1950 |
| 2,638,742 | Carey | May 19, 1953 |
| 2,850,873 | Hausmann | Sept. 9, 1958 |
| 2,857,739 | Wright | Oct. 28, 1958 |
| 2,887,845 | Hagen | May 26, 1959 |
| 2,916,876 | Colley et al. | Dec. 15, 1959 |
| 2,979,900 | Hopper | Apr. 18, 1961 |